US011086792B2

(12) United States Patent
Fan et al.

(10) Patent No.: US 11,086,792 B2
(45) Date of Patent: Aug. 10, 2021

(54) CACHE REPLACING METHOD AND APPARATUS, HETEROGENEOUS MULTI-CORE SYSTEM AND CACHE MANAGING METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qingwen Fan, Beijing (CN); Jinghua Miao, Beijing (CN); Hao Zhang, Beijing (CN); Lili Chen, Beijing (CN); Lixin Wang, Beijing (CN); Bin Zhao, Beijing (CN); Yukun Sun, Beijing (CN); Xuefeng Wang, Beijing (CN); Xi Li, Beijing (CN); Wenyu Li, Beijing (CN); Jinbao Peng, Beijing (CN); Jianwen Suo, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/391,914

(22) Filed: Apr. 23, 2019

(65) Prior Publication Data
US 2020/0004692 A1    Jan. 2, 2020

(30) Foreign Application Priority Data
Jul. 2, 2018    (CN) .......................... 201810708886.3

(51) Int. Cl.
G06F 12/123    (2016.01)
G06F 9/54      (2006.01)
(Continued)

(52) U.S. Cl.
CPC ............ *G06F 12/123* (2013.01); *G06F 9/544* (2013.01); *G06F 12/0842* (2013.01); *G06T 1/60* (2013.01)

(58) Field of Classification Search
CPC .. G06F 9/544; G06F 12/0811; G06F 12/0842; G06F 12/123; G06F 12/126; G06T 1/60
See application file for complete search history.

(56) References Cited

U.S. PATENT DOCUMENTS

2007/0094450 A1* 4/2007 VanderWiel .......... G06F 12/126
                                                  711/133
2008/0040554 A1* 2/2008 Zhao .................... G06F 12/126
                                                  711/133
(Continued)

FOREIGN PATENT DOCUMENTS

CN    102662863 A    9/2012
CN    104572502 A    4/2015
(Continued)

OTHER PUBLICATIONS

First Chinese Office Action from priority Chinese application No. 201810708886.3 dated May 20, 2020.
(Continued)

*Primary Examiner* — Larry T MacKall
(74) *Attorney, Agent, or Firm* — Dilworth & Barrese, LLP.; Michael J. Musella, Esq.

(57) ABSTRACT

This disclosure provides a cache replacing method applied to a heterogeneous multi-core system, the method including: determining whether a first application currently running is an application running on the GPU; when it is determined that the first application currently running is an application running on the GPU, determining a cache priority of first data accessed by the first application according to a performance parameter of the first application, the cache priority of the first data including a priority other than a predefined
(Continued)

highest cache priority; and caching the first data into a cache queue of the shared cache according to a predetermined cache replacement algorithm and the cache priority of the first data, and replacing data in the cache queue.

18 Claims, 9 Drawing Sheets

(51) Int. Cl.
*G06F 12/0842* (2016.01)
*G06T 1/60* (2006.01)

(56) References Cited

U.S. PATENT DOCUMENTS

2011/0252200 A1\* 10/2011 Hendry ............... G06F 12/0831
711/121
2012/0272011 A1 10/2012 Carrie et al.

FOREIGN PATENT DOCUMENTS

| CN | 105022697 A | 11/2015 |
| CN | 106383792 A | 2/2017 |
| CN | 107368437 A | 11/2017 |
| CN | 107463510 A | 12/2017 |

OTHER PUBLICATIONS

Yang et al. "DIPP—An LLC Replacement Policy for On-chip Dynamic Heterogeneous Multi-core Architecture" Journal, 2015, pp. 386-397, ICYCSEE 2015, CC15503 Springer-Verlag Berlin Heidelberg.
Zhan-sheng et al. "Improved-LRFU-algorithm-with-adaptive-replacement" Computer Engineering and Applications 2008 (49) 17, pp. 153-158, Beijing China.

\* cited by examiner

CACHE REPLACING METHOD AND APPARATUS, HETEROGENEOUS MULTI-CORE SYSTEM AND CACHE MANAGING METHOD

TECHNICAL FIELD

The present disclosure relates to the field of data processing technique, and more particularly, to a cache replacing method, a cache replacing apparatus, a heterogeneous multi-core system and a cache managing method.

BACKGROUND

A heterogeneous multi-core system refers to integration of multiple single-core or multi-core processors of different types on a chip, it has the characteristics of small size and high computing performance.

Multi-level cache is usually used in the heterogeneous multi-core system, each processor has its own independent private one-level or multi-level cache, and all processors have a shared cache. The shared cache is used by multiple processors together and usually is the last-level cache of the multi-level cache. In the multi-level cache, when the processor performs data processing, data may first be read from the first-level cache that is closest to the processor; when there is no data to be read in said level of cache, data is read from the subsequent respective levels in sequence; when there is no data to be read in each level of cache, data is invoked from the memory, in this way, the data processing speed of the processor can be improved.

In the multi-level cache architecture, since multiple processors of different types share resources of the last-level cache, this causes competition for cache resources and renders a phenomenon of contention conflict, thereby reducing a hit rate for cache. Therefore, cache utilization is an important factor affecting computing capability and computing speed of the heterogeneous multi-core system.

SUMMARY

According to some aspects of the embodiments of the present disclosure, there is provided a cache replacing method applied to a heterogeneous multi-core system, the heterogeneous multi-core system including at least one central processing unit CPU, at least one graphic processing unit GPU and a shared cache, the method including: determining whether a first application currently running is an application running on the GPU; when it is determined that the first application currently running is an application running on the GPU, determining a cache priority of first data accessed by the first application according to a performance parameter of the first application, the cache priority of the first data including a priority other than a predefined highest cache priority; and caching the first data into a cache queue of the shared cache according to a predetermined cache replacement algorithm and the cache priority of the first data, and replacing data in the cache queue.

Optionally, the method further includes: determining whether a second application currently running is an application running on the CPU; when it is determined that the second application currently running is an application running on the CPU, determining a cache priority of second data accessed by the second application according to a performance parameter of the second application, the cache priority of the second data including the predefined highest cache priority; and caching the second data into the cache queue of the shared cache according to the predetermined cache replacement algorithm and the cache priority of the second data, and replacing data in the cache queue.

According to some embodiments of the present disclosure, determining a cache priority of first data accessed by the first application according to a performance parameter of the first application includes: determining a running type of the first application according to the performance parameter of the first application, and determining the cache priority of the first data accessed by the first application according to the running type; determining a cache priority of second data accessed by the second application according to a performance parameter of the second application includes: determining a running type of the second application according to the performance parameter of the second application, and determining the cache priority of the second data accessed by the second application according to the running type.

Optionally, the method further includes: adding a removal information queue, data replaced from the cache queue being stored in the removal information queue; determining whether the first data and/or the second data hits the cache queue, if not, determining whether an address of the first data and/or an address of the second data is present in the removal information queue, if yes, increasing the number of times of hitting the removal information queue, and if not, increasing the number of times of failing to hit the removal information queue.

Optionally, the method further includes: determining whether the number of times of hitting the removal information queue is greater than the number of times of failing to hit the removal information queue; if yes, updating an algorithm type identifier, and determining a cache replacement algorithm to be used according to the algorithm type identifier updated.

Optionally, determining a cache replacement algorithm to be used according to the algorithm type identifier updated includes: if the algorithm type identifier is a first identifier, determining that the cache replacement algorithm to be used is the Least Recently Used LRU algorithm, and if the algorithm type identifier is a second identifier, determining that the cache replacement algorithm to be used is the Least Frequently Used LFU algorithm.

According to some aspects of the present disclosure, there is further provided a cache managing method applied to a heterogeneous processing system in which a central processing unit CPU and a graphic processing unit GPU that share a cache are included, the method including: determining a type of a processor on which an application is running; and determining a cache priority of the data accessed by the application based on the type of the processor on which the application is running and a performance parameter of the application.

According to some embodiments of the present disclosure, determining a cache priority of the data accessed by the application includes: determining a running type of the application according to the performance parameter of the application, and determining the cache priority of the data accessed by the application according to the running type.

According to some embodiments of the present disclosure, the method further includes: setting the highest level of a CPU application's cache priority to be higher than the highest level of a GPU application's cache priority, wherein the CPU application corresponds to an application running on the CPU, and the GPU application corresponds to an application running on the GPU.

According to some embodiments of the present disclosure, setting the highest level of a CPU application's cache priority to be higher than the highest level of a GPU application's cache priority includes: setting the cache priority of the CPU application to a priority including the predefined highest cache priority in the cache queue, and setting the cache priority of the GPU application to a priority other than the predefined highest cache priority in the cache queue.

According to some embodiments of the present disclosure, the method further includes: in the case where the data fails to hit the cache queue, caching the data into the cache queue according to the cache priority of the data, and replacing data in the cache queue according to a predetermined cache replacement algorithm.

According to some embodiments of the present disclosure, the method further includes: adding a removal information queue, data replaced from the cache queue being stored in the removal information queue; determining whether the data accessed by the application hits the cache queue, in the case of failing to hit the cache queue, determining whether an address of the data is present in the removal information queue: in the case of being present in the removal information queue, increasing the number of times of hitting the removal information queue, and in the case of being not present in the removal information queue, increasing the number of times of failing to hit the removal information queue; and determining the cache replacement algorithm based on the number of times of hitting the removal information queue and the number of times of failing to hit the removal information queue.

According to some aspects of the embodiments of the present disclosure, there is provided a cache replacing apparatus applied to a heterogeneous multi-core system, the heterogeneous multi-core system including at least one central processing unit CPU, at least one graphic processing unit GPU and a shared cache, the apparatus including: an application determining unit configured to determine whether a first application currently running is an application running on the GPU; a cache determining unit configured to, when it is determined that the first application currently running is an application running on the GPU, determine a cache priority of first data accessed by the first application according to a performance parameter of the first application, the cache priority of the first data including a priority other than a predefined highest cache priority; and a data caching unit configured to cache the first data into a cache queue of the shared cache according to a predetermined cache replacement algorithm and the cache priority of the first data, and replace data in the cache queue.

Optionally, the application determining unit is further configured to: determine whether a second application currently running is an application running on the CPU; the cache determining unit is further configured to: when it is determined that the second application currently running is an application running on the CPU, determine a cache priority of second data accessed by the second application according to a performance parameter of the second application, the cache priority of the second data including the predefined highest cache priority; and the data caching unit is further configured to: cache the second data into the cache queue of the shared cache according to the predetermined cache replacement algorithm and the cache priority of the second data, and replace data in the cache queue.

Optionally, the cache determining unit includes: a running type determining unit configured to determine a running type of the first application according to the performance parameter of the first application, and determine a running type of the second application according to the performance parameter of the second application; and a cache priority determining unit configured to determine the cache priority of the first data accessed by the first application according to the running type of the first application, and determine the cache priority of the second data accessed by the second application according to the running type of the second application.

Optionally, the apparatus further includes: a removal information queue adding unit configured to add a removal information queue, data replaced from the cache queue being stored in the removal information queue; a number of times of cache queue increasing unit configured to increase the number of times of hitting the cache queue when it is determined that the first data and/or the second data hits the cache queue; and a removal information queue determining unit configured to, when it is determined that the first data and/or the second data fails to hit the cache queue, determine whether an address of the first data and/or an address of the second data is present in the removal information queue, if yes, increase the number of times of hitting the removal information queue, and if not, increase the number of times of failing to hit the removal information queue.

Optionally, the apparatus further includes: a cache replacement algorithm updating unit configured to, when it is determined that the number of times of hitting the removal information queue is greater than the number of times of failing to hit the removal information queue, update an algorithm type identifier, and determine a cache replacement algorithm to be used according to the algorithm type identifier updated.

According to some aspects of the embodiments of the present disclosure, there is provided a heterogeneous multi-core system, including at least one central processing unit CPU, at least one graphic processing unit GPU and a shared cache, characterized in further including a machine-readable storage medium having stored therein machine-executable instructions executable by a processor, the processor is enabled by the machine-executable instructions to perform the cache managing method as described above.

BRIEF DESCRIPTION OF THE DRAWINGS

The drawings herein are incorporated in the specification and constitute a part of this specification, they show the embodiments in conformity with the present disclosure and are used in conjunction with the specification to explain the principles of the present disclosure.

Through the more detailed description of the embodiments of the present disclosure with reference to the accompanying drawings, the above and other objectives, features and advantages of the present disclosure will become more apparent. The drawings are to provide further understanding for the embodiments of the present disclosure and constitute a part of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

Figure 1:
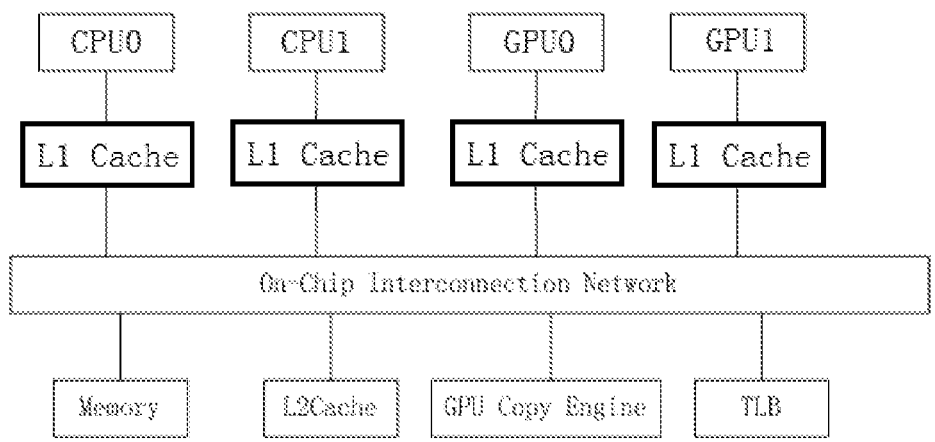
FIG. 1 is a schematic structural diagram of a heterogeneous multi-core system provided according to an exemplary embodiment of the present disclosure.

Exemplary embodiments will be described in detail herein, examples of which are illustrated in the drawings. When the drawings are concerned in the following description, the same number in different drawings refers to the same or similar elements unless otherwise indicated. The implementations described in the following exemplary embodiments do not represent all implementations in conformity with the present disclosure. Instead, they are merely examples of apparatus and methods in conformity with some aspects of the present disclosure as detailed in the appended claims.

FIG. 1 is a schematic diagram of architecture of a heterogeneous multi-core system, as shown in FIG. 1, the heterogeneous multi-core system includes multiple processors, which are two CPUs (CPU0 and CPU1, respectively) and two GPUs (GPU0 and GPU1, respectively), each processor is for example a single-core processor, each processor has its own independent private first-level cache L1 Cache and a shared second-level cache L2 Cache, said system also includes a memory, a GPU Copy Engine and a TLB (Translation Lookaside Buffer, TLB for short). The GPU Copy Engine is used to receive data processed by the GPU and transmit it to the corresponding GPU for further processing by the GPU. The TLB is a memory management unit, the TLB may be applied to an operating system of an X86 architecture or an operating system of another architecture, and is a buffer for improving the speed of conversion from a virtual address to a physical address. And the respective processors are interconnected via an On-Chip Interconnection Network, thus data communication among the respective processors is effectuated.

Capacity of the second-level cache which serves as the shared cache is limited, and actual demand of the processor for the cache is far greater than the cache's capacity. In actual applications, when the processor accesses the data, the priority corresponding to the data may be depended on to determine a position where the data is to be inserted for example in the cache queue. In addition, a cache replacement algorithm may be used to perform replacement updates on data already present in the cache queue. The role of the cache replacement algorithm is to determine the position of the appropriate replaced data. The cache replacement algorithm can efficiently cache frequently-used data in the cache and provide faster access to data, thereby increasing system throughput and reducing response time.

The cache replacement algorithm applied to the heterogeneous multi-core system may be the Least Recently Used (LRU for short) algorithm, the core idea of the LRU algorithm is that if the data is recently accessed, its probability of being accessed in the future is higher. Specifically, the cache uses one cache queue to store the cached data, wherein the most recently accessed data is stored in the head of the cache queue (the cache queue may also be referred to as a data link list), for example, the first bit can be referred to as the head, the data at the head has the highest cache priority. The other data is sequentially stored in the cache queue according to the access time, the earliest accessed data is stored at the tail of the cache queue, and the data at the tail has the lowest priority.

Figure 2A:
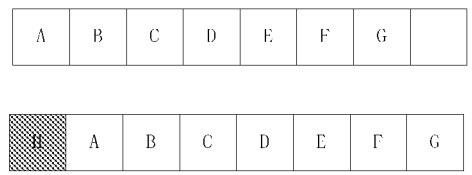
FIG. 2A is a schematic diagram of a data replacement manner in a cache queue provided according to an exemplary embodiment of the present disclosure.

FIG. 2A is a schematic diagram of data replacement manner in a cache queue provided according to an exemplary embodiment of the present disclosure. As shown in FIG. 2A, the cache queue includes 8 data, corresponding to a length of 8 data (herein, one data refers to data having a certain length occupying a certain storage space size). The cache queue in FIG. 2A has already stored 7 data, which are data A, data B, data C, data D, data E, data F and data G, wherein one position (the last position in the cache queue) has not been stored with data. When accessing one new data H, data H to be accessed does not appear in the cache queue, which may be called as failing to hit the cache queue. Since the cache queue is not full, that is, there is still a cache space of one position in the cache queue that can be used to store data H, the new data H is inserted into the head of the cache queue, and other data in the cache queue is sequentially retreated.

Figure 2B:
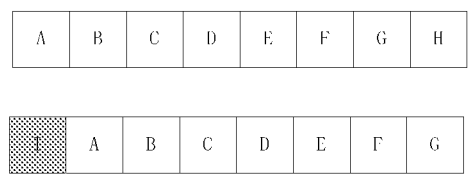
FIG. 2B is a schematic diagram of a data replacement algorithm in a cache queue provided according to another exemplary embodiment of the present disclosure.

FIG. 2B is a schematic diagram of a data replacement algorithm in a cache queue provided according to another exemplary embodiment of the present disclosure. As shown in FIG. 2B, if the cache queue is full, that is, 8 data are already stored in the cache queue, which are data A, data B, data C, data D, data E, data F, data G and data H, respectively. In the case that data I to be accessed is not present in the cache queue, it is called as failing to hit the cache queue, since there is no space in the cache queue where data I can be stored, at this time, data I is inserted into the head of the cache queue, and the other data in the cache queue is retreated in sequence, because data H is located at the tail of the cache queue, data H will be eliminated, that is, the earliest accessed data H which has the lowest cache priority is removed from the cache queue.

Figure 2C:
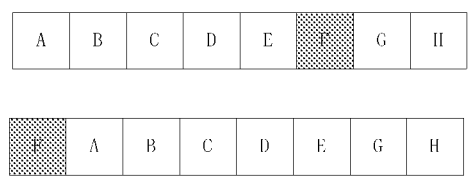
FIG. 2C is a schematic diagram of a data replacement manner in a cache queue provided according to still another exemplary embodiment of the present disclosure.

FIG. 2C is a schematic diagram of a data replacement manner in a cache queue provided according to still another exemplary embodiment of the present disclosure. As shown in FIG. 2C, when the data to be accessed is data in the cache queue, that is, the data to be accessed is present in the cache queue, it may be referred to as hitting the cache queue, for example, in the case that data F is to be accessed, that is, data F in the cache queue is hit, in this case, data F is inserted into the head of the cache queue, the data after data F remains in the original position, and the data located before data F is sequentially retreated.

In the above LRU algorithm, the position where the data is located in the cache queue reflects an recently accessed degree of the data, the head of the cache queue may be referred to as the MRU bit of the cache queue, and the tail of the cache queue is referred to as the LRU bit of the cache queue, data in the MRU bit of the queue has the latest access time, which has the highest re-use capability. Once the cache queue is full, the most recently accessed data will be inserted into the MRU bit of the cache queue, and the data in the LRU bit of the cache queue will be replaced, that is, being discarded. A life cycle of the data in the cache queue is from entering the MRU bit in the cache queue, and sequentially being retreated to the LRU bit of the cache queue, until it is eliminated.

The data in each bit in the cache queue has its own cache priority, the cache priority of the data in the MRU bit in the cache queue is the highest cache priority, its cache priority is for example 7, the cache priority of the data located behind the MRU bit of the cache queue is successively decremented, their cache priority is for example 6, 5, 4, 3, 2, 1 and 0, the data with the lowest cache priority is at the tail of the cache queue, and its cache priority is 0.

The LRU algorithm is simpler to implement, for some data with a high recent access frequency, the hit rate for cache is high, but for data access by sporadic and periodic operations, the hit rate for cache is low, so there is a cache jitter phenomenon, that is, many data to be accessed will not hit the cache, so the cache space cannot be fully utilized.

Another type of the cache replacement algorithm is the Least Frequently Used (LFU for short) algorithm, the core idea of this algorithm is that if the data is accessed multiple times in the past, its frequency to be accessed in the future will be higher, the data is eliminated according to a historical access frequency of the data. Specifically, the cache also uses a cache queue to store the cached data, each data in the cache queue has a counter to record the number of times of being accessed, and all the data is sorted according to the number of times of being accessed, data having the same number of times of being accessed is sorted by time.

In the LFU algorithm, the data with the least number of times of being accessed is first eliminated, and the newly added data is inserted into the tail of the cache queue (because the number of times of being accessed is 1), after the data in the cache queue is accessed, the number of times of being accessed is increased, and the data in the cache queue is sorted, when the cache queue is full, the data at the tail of the cache queue is eliminated.

The LFU algorithm can avoid the problem of low hit rate when accessing data by periodic or sporadic operations, but it needs to record the access history of data, each data requires maintenance about the number of times of being accessed and is thereby sorted, and its memory consumption is high.

In the CPU-GPU multi-core heterogeneous system, the Central Processing Unit (CPU for short) is mainly responsible for performing serial tasks and logic control, the Graphic Processing Unit (GPU for short) is mainly responsible for parallel computing tasks.

For the shared cache, it serves as the shared cache of cores of multiple processors (including GPU and CPU), the applications running on the CPU and the applications running on the GPU concurrently use the shared cache, different applications will get cache resources of different sizes based on different numbers of cache access amount, and the application with larger cache requirement will get more cache resources. Since the GPU application has high frequency memory access characteristics, the GPU application's data will be replaced at a faster rate than the CPU application's data so that in the cache queue, the data of the application running on the GPU will quickly replace the data of the application running on the CPU.

Figure 2D:
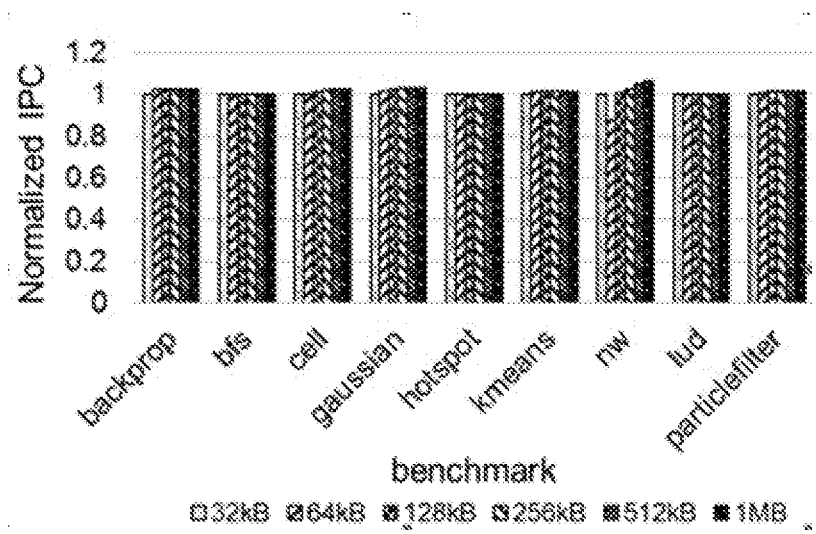
FIG. 2D is a schematic diagram showing the relationship between IPC value sizes of respective applications running on a GPU in cache spaces of different sizes according to an exemplary embodiment of the present disclosure.

However, referring to FIG. 2D, which shows the relationship between Instruction Per Clock (IPC for short) value sizes of respective applications running on a GPU in cache spaces of different sizes, wherein the abscissa represents different applications running on the GPU, for example, including: backprop (a neural network algorithm program), bfc (a briefcase file processing tool software program in Windows), cell (a report secondary development tool software), gaussian (a quantum chemical integrated software program), hotspot (a wireless hotspot software program), kmeans (an unsupervised learning algorithm program), nw (a desktop software creation program), lud (a system optimization software program) and particlefilter (an image tracking filter algorithm Program), the ordinate represents the normalized IPC value.

IPC (Instruction per Clock) refers to the number of instructions executed in each clock cycle, which represents the performance of a processor, the larger the IPC value is, the better the performance of the processor is, as known from the table in FIG. 2D, for most applications running on the GPU, their performance does not increase with the increase of the cache space, therefore, the LRU algorithm is used as a replacement strategy for the shared cache, most space of the shared cache is occupied by applications running on the GPU with high frequency memory access characteristics, resulting in unreasonable allocation of shared cache resources and low utilization of the shared caches.

As known from the above description, for the heterogeneous multi-core system, adopting the LRU algorithm as the replacement strategy for the shared cache fails to utilize the separate characteristics of the application running on the GPU and the application running on the CPU, so utilization of the shared cache is low.

The present disclosure provides a cache replacing method applied to a heterogeneous multi-core system including a central processing unit CPU and a graphic processing unit GPU that share the cache, for example, the GPU and the CPU share the second-level cache L2 Cache in FIG. 1 and, in addition, they may each have a separate cache, for example, a first-level cache L1 Cache.

Figure 3:
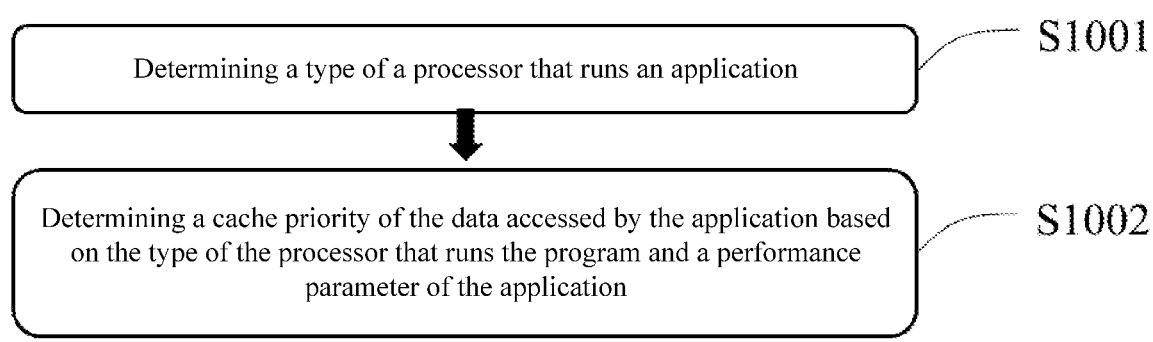
FIG. 3 shows a flowchart of a cache managing method provided according to some embodiments of the present disclosure.

FIG. 3 shows a flowchart of a cache managing method provided according to some embodiments of the present disclosure. As shown in FIG. 3, first, in step S1001, a type of a processor that runs an application is determined, for example, for an application that is to access data, the type of processor that runs the program may be determined first, including but not limited to a GPU processor and a CPU processor.

Next, in step S1002, a cache priority of the data accessed by the application is determined based on the type of the processor that runs the program and a performance parameter of the application.

According to the embodiments of the present disclosure, determining a cache priority of the data accessed by the application includes: determining a running type of the application according to the performance parameter of the application, and determining the cache priority of the data accessed by the application according to the running type.

For example, in the case where the processor running the application is a GPU, the running type of the application can be determined based on the performance parameter of the application. For example, classification may be made according to values of two parameters APKI and USpeedup, the running type of the application may be a Cache-Friendly application, a large-Working Set application, a Compute-Intensive application and a Stream application which will be described below in detail.

According to the embodiments of the present disclosure, the cache managing method may further include: setting the highest level of a CPU application's cache priority to be higher than the highest level of a GPU application's cache priority, wherein the CPU application corresponds to an application running on the CPU, and the GPU application corresponds to an application running on the GPU.

According to the embodiments of the present disclosure, setting the highest level of a CPU application's cache priority to be higher than the highest level of a GPU application's cache priority includes: setting the cache priority of the CPU application to a priority including a predefined highest cache priority in the cache queue, and setting the cache priority of the GPU application to a priority other than the predefined highest cache priority in the cache queue.

According to the embodiments of the present disclosure, the cache managing method may further include: in the case where the data fails to hit the cache queue, caching the data into the cache queue according to the cache priority of the data, and replacing data in the cache queue according to a predetermined cache replacement algorithm.

According to the embodiments of the present disclosure, the cache managing method may further include: adding a removal information queue, data replaced from the cache queue being stored in the removal information queue; determining whether the data accessed by the application hits the cache queue, in the case of failing to hit the cache queue, determining whether an address of the data is present in the removal information queue: in the case of being present in the removal information queue, increasing the number of times of hitting the removal information queue, and in the case of being not present in the removal information queue, increasing the number of times of failing to hit the removal information queue; and determining the cache replacement algorithm based on the number of times of hitting the removal information queue and the number of times of failing to hit the removal information queue.

It is known from the foregoing technical solution that, the cache managing method according to the present disclosure improves overall utilization of the cache while ensuring performance of the GPU, and is conductive to improve computing capability and computing speed of the heterogeneous multi-core system.

The embodiments of the present disclosure further provides a cache replacing method applied to a heterogeneous multi-core system, the heterogeneous multi-core system includes at least one central processing unit CPU, at least one graphic processing unit GPU and a shared cache.

Figure 4A:
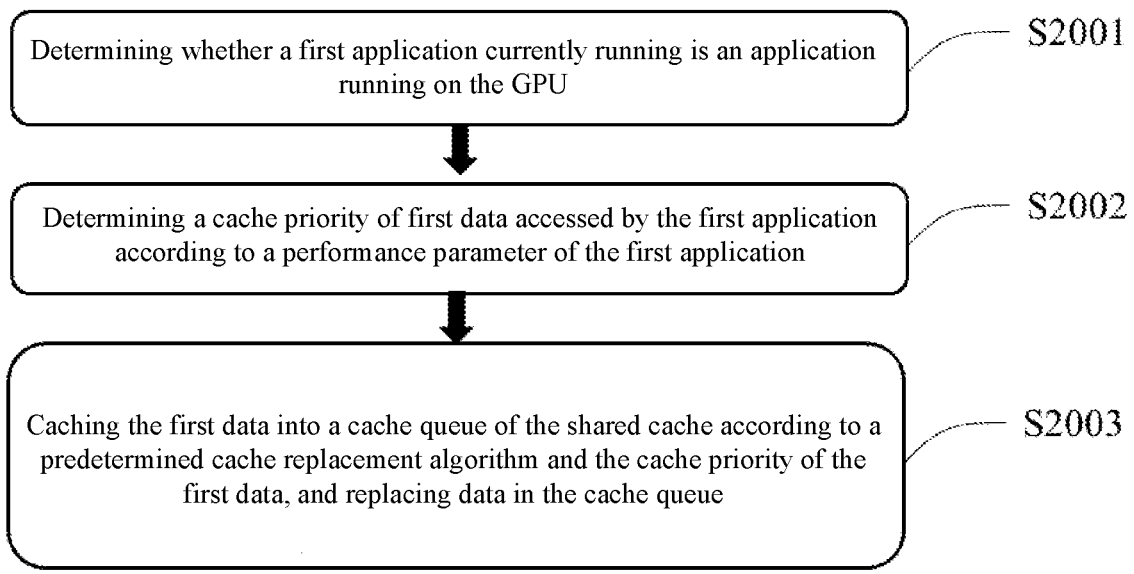
FIG. 4A shows a flowchart of a cache replacing method provided according to the embodiments of the present disclosure.

FIG. 4A shows a flowchart of a cache replacing method provided according to the embodiments of the present disclosure, as shown in FIG. 4A, the method may include the following steps. First, in step S2001, it is determined whether a first application currently running is an application running on the GPU. Next, in step S2002, when it is determined that the first application currently running is an application running on the GPU, a cache priority of first data accessed by the first application is determined according to a performance parameter of the first application, the cache priority of the first data includes a priority other than a predefined highest cache priority. Next, in step S2003, the first data is cached into a cache queue of the shared cache according to a predetermined cache replacement algorithm and the cache priority of the first data, and data in the cache queue is replaced.

According to the embodiments of the present disclosure, determining a cache priority of first data accessed by the first application according to a performance parameter of the first application includes: determining a running type of the first application according to the performance parameter of the first application, and determining the cache priority of the first data accessed by the first application according to the running type.

Figure 4B:
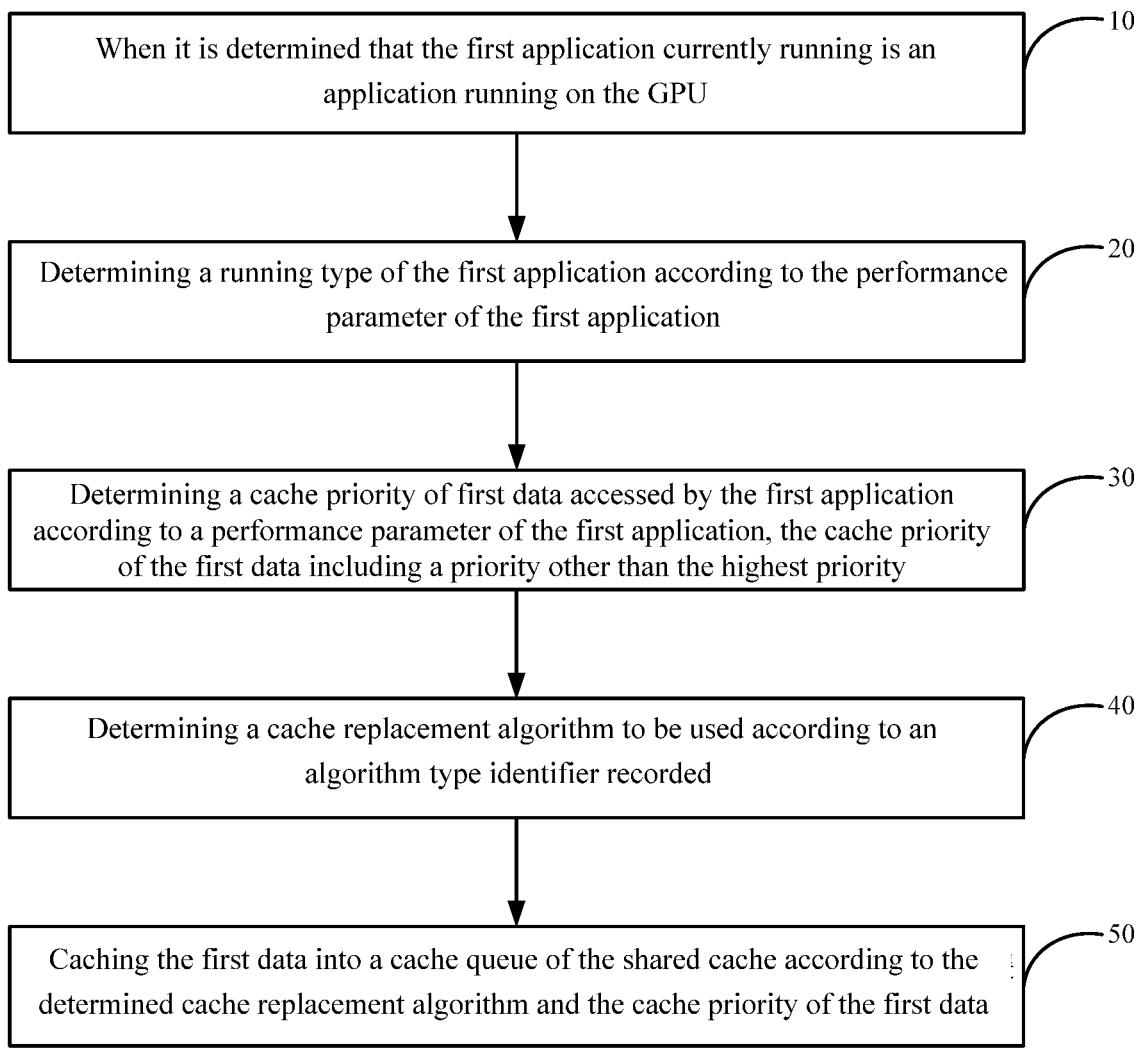
FIG. 4B is an example flowchart of a cache replacing method provided according to the present disclosure.

FIG. 4B shows an example flowchart of a cache replacing method provided according to some embodiments of the present disclosure. As shown in FIG. 4B, the method includes: step S10, when it is determined that the first application currently running is an application running on the GPU; step S20, determining a running type of the first application according to the performance parameter of the first application; step S30, determining a cache priority of first data accessed by the first application according to a performance parameter of the first application, the cache priority of the first data including a priority other than a predefined highest cache priority; step S40, determining a cache replacement algorithm to be used according to an algorithm type identifier recorded; step S50, caching the first data into a cache queue of the shared cache according to the determined cache replacement algorithm and the cache priority of the first data.

In the embodiments, when it is determined that the currently running first application is an application running on the GPU, the running type of the first application is determined according to the performance parameter of the first application.

The performance parameter of the application is a parameter that reflects performance characteristics of the application, for example, the running type of the first application may be determined by using two performance parameters: the Access per kilo-Instruction APKI and the acceleration parameter USpeedup.

The Access per kilo-Instruction (APKI for short) is a parameter that reflects the frequency at which an application accesses the memory, an application with a higher APKI value has more memory access.

USpeedup represents a reduction rate of lost data amount when allocation of 8-way cache by the application and allocation of 1-way cache by the application are compared, the larger the value of USpeedup is, the higher the hit rate can be achieved when the application accesses the cache, it may be calculated by adopting the calculation formula as follows:

$$USpeedup = \frac{miss_{1way} - miss_{8way}}{miss_{8way}},$$

where $miss_{1way}$ represents an amount of lost data in allocation of 1-way cache, $miss_{8way}$ represents an amount of lost data in allocation of 8-way cache.

As to the application running on the GPU and the application running on the CPU, different applications can be classified according to values of the two parameters APKI and USpeedup as described above, for example, the application running on the GPU may be classified into four types: a Cache-Friendly application, a Large-Working Set application, a Compute-Intensive application and a Stream application. Exemplarily, a running type of the application running on the GPU may be classified according to a set threshold, for example: when the application's APKI>η and USpeedup>θ, the application is a Cache-Friendly type; when the application's APKI>η and USpeedup<θ, the application is a Large-Working Set type; when the application's APKI<η, the application is a Compute-Intensive type; when the application's APKI>η and USpeedup=0, the application is a a Stream type.

The above-described thresholds η and θ may be set empirically, for example, η=5, θ=15%.

Different applications have different access frequencies and access amounts to the memory, specifically, for the Cache-Friendly application, the number of its threads is small, the memory access frequency is low, and the amount of cache access is small, therefore, when the first application is a Cache-Friendly application, a lower cache priority may be set for it, that is, the first data accessed by the first application is cached in the shared cache queue in a position closer to the tail of the queue, so that the first data can be removed from the shared cache queue in a short period of time. That is, the first data can be eliminated faster When the first application is a Compute-Intensive application, the number of its threads is larger, a higher cache priority can be set for it, that is, the first data accessed by the first application is cached in the shared cache queue in a position closer to the head of the queue, the first data has a longer life cycle in the shared cache queue, and likewise. When the first application is a Large-Working Set application or a Stream application, the corresponding cache priority is set for the first application and the first data accessed by the first application is stored in a corresponding position in the shared cache queue.

After the cache priority is determined, the cache replacement algorithm is further determined according to the recorded algorithm type identifier, the algorithm type identifier refers to an identifier used to represent the cache replacement algorithm, and different identifiers represent different cache replacement algorithms, for example, if the identifier is "0", it indicates that the LRU algorithm is used as the cache replacement algorithm to be used currently, if the identifier is "1", the LFU algorithm is used as the cache replacement algorithm to be used currently.

When the used cache replacement algorithm is different, it means that the replacement strategy for data in the cache queue is different, and the first data may be cached into the cache queue based on the cache replacement algorithm and in conjunction with the cache priority. Specifically, if the cache replacement algorithm is determined according to the algorithm type identifier to be the LRU algorithm, data in the cache queue is replaced according to the Least-Recently-Use strategy, when the first application is running, after the cache priority of the first data to be accessed is determined, the position where the first data is to be cached in the cache queue may be determined according to the cache priority, for example, for the first data most recently accessed by the first application, if the data is not in the cache queue stored previously in the shared cache, that is, failing to hit the cache queue, the first data is inserted into the corresponding position in the cache queue according to the cache priority, position of the data whose priority is before the priority of the first data remains unchanged, and the data whose priority is behind the priority of first data is sequentially retreated. If the cache queue is full, after the first data is inserted into the corresponding position in the cache queue according to the cache priority, the data at the tail of the cache queue will be removed from the cache queue, that is, the earliest accessed data at the tail of the cache queue is eliminated. If the first data is already in the cache queue stored previously in the shared cache, that is, hitting the cache queue, in this case, the first data that hits is inserted into the corresponding position in the cache queue according to the cache priority, the data before the insertion position remains in the original position, and the data after the insertion position is retreated in sequence.

If the cache replacement algorithm is determined to be the LFU algorithm according to the algorithm type identifier, data in the cache queue is replaced according to the Least Recently Use strategy. For example, the first data most recently accessed by the first application is inserted into the corresponding position in the cache queue according to the cache priority, data in the cache queue is sorted according to the number of times of being accessed. If the cache queue is full, the data at the tail of the cache queue is eliminated. That is, the data with the least number of times of being accessed is eliminated, after the data is accessed, the number of times of being accessed to the corresponding data increases, and data in the cache queue is re-sorted.

The difference between the GPU architecture and the CPU architecture leads to different access memory characteristics of the two. By means of making statistics of the APKI values of different applications, it shows that the application running on the GPU has a much higher access frequency than the application running on the CPU, but the GPU's performance cannot be significantly improved when allocating more cache to an application running on the GPU. For GPU, its application can reduce the negative impact of memory latency through thread parallelism, while most Compute-Intensive benchmark applications running on the CPU can only compensate for memory latency by extending the cache space, so applications running on the CPU have more sensitive cache requirements than applications running on the GPU.

Based on this, in the embodiments, the cache priority of the first data accessed by the first application running on the GPU does not include the highest cache priority (i.e., the data accessed by the first application on the GPU will not be stored in the MRU bit of the cache queue), but only include a priority other than the highest cache priority (that is, the data accessed by the first application on the GPU can only be stored in the bit other than the MRU bit of the cache queue). In other words, the application running on the GPU cannot have the MRU bit with the highest cache priority and the longest life cycle in the cache queue, which prevents the application running on the GPU from squeezing cache resources of the CPU, not only can the data be dynamically inserted according to the running type of the application, but also can enable reasonable cache resources to be allocated for applications running on the GPU in the heterogeneous multi-core system, and overall utilization of the cache is improved while performance of the GPU is ensured, which is conductive to improve computing capability and computing speed of the heterogeneous multi-core system.

Figure 5A:
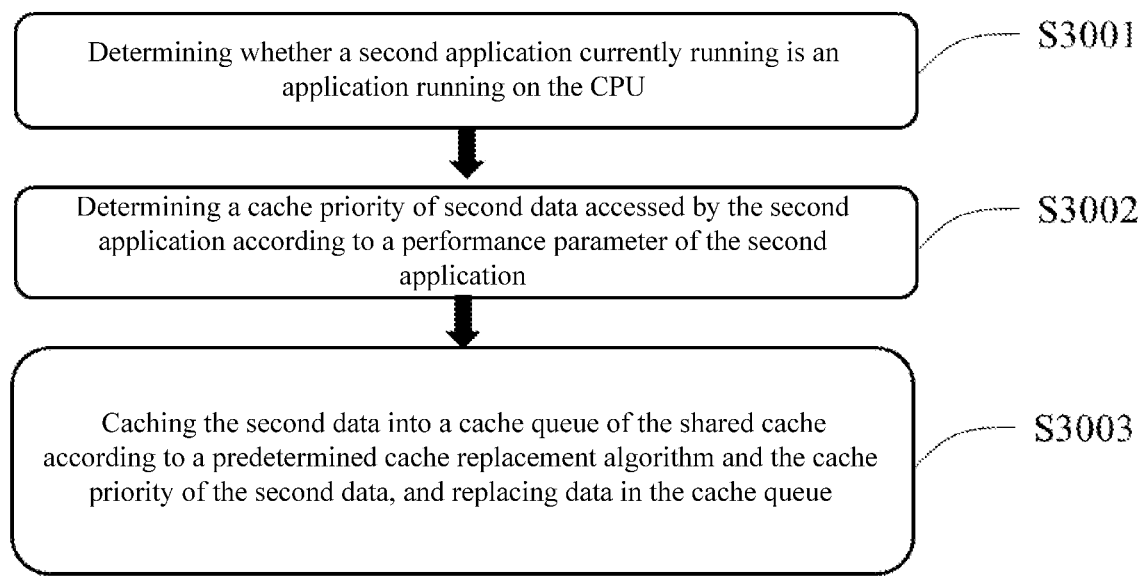
FIG. 5A is a flowchart of a cache replacing method provided according to another exemplary embodiment of the present disclosure.

FIG. 5A is a flowchart of a cache replacing method provided according to another exemplary embodiment of the present disclosure. As shown in FIG. 5A, the cache replacing method may further include the following steps: first, in step S3001, it is determined whether a second application currently running is an application running on the CPU. Next, in step S3002, when it is determined that the second application currently running is an application running on the CPU, a cache priority of second data accessed by the second application is determined according to a performance parameter of the second application, the cache priority of the second data includes the highest cache priority. Next, in step S3003, the second data is cached into a cache queue of the shared cache according to a predetermined cache replacement algorithm and the cache priority of the second data, and data in the cache queue is replaced.

According to the embodiments of the present disclosure, determining a cache priority of second data accessed by the second application according to a performance parameter of the second application includes: determining a running type of the second application according to the performance parameter of the second application, and determining the cache priority of the second data accessed by the second application according to the running type.

Figure 5B:
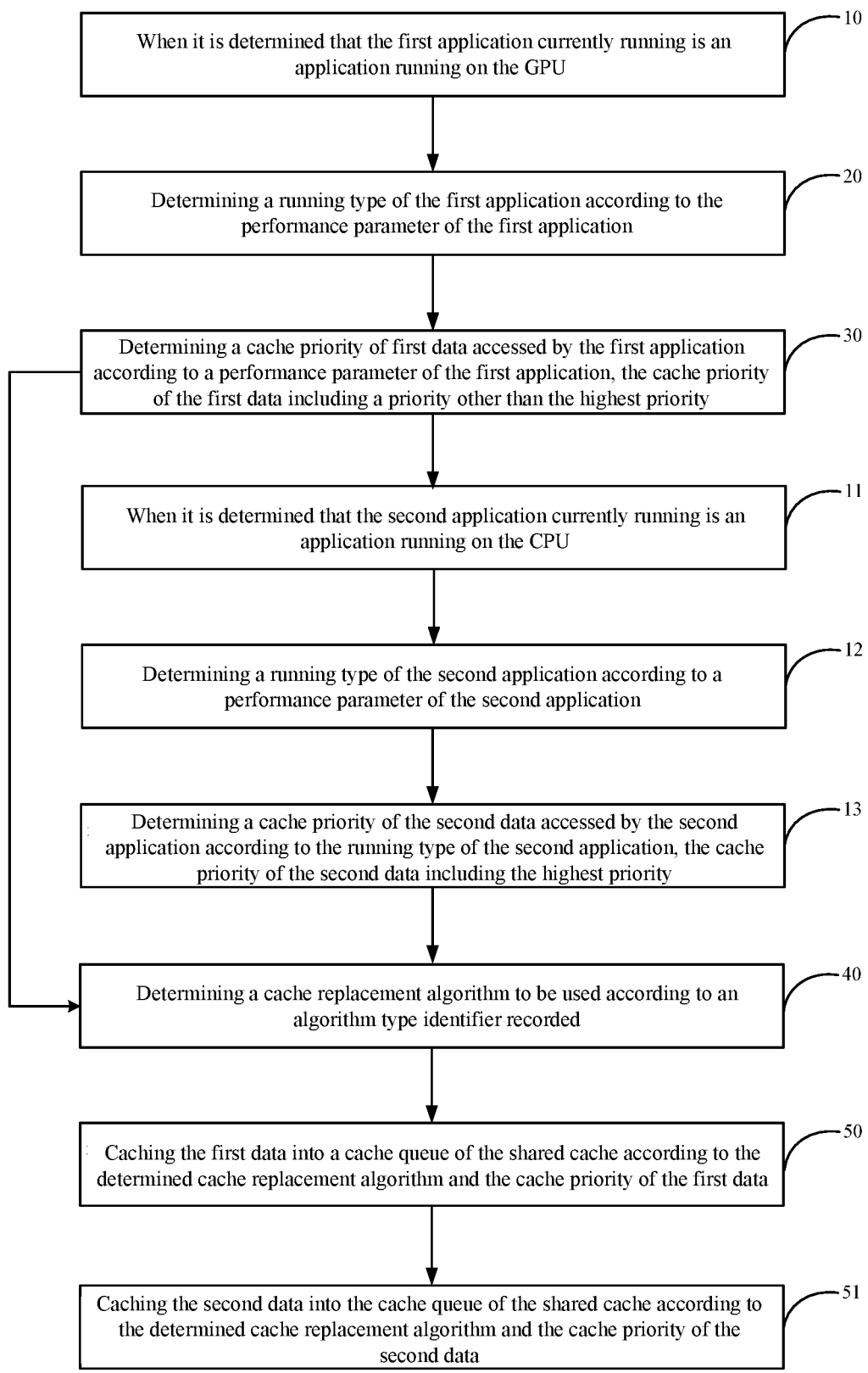
FIG. 5B is an example flowchart of a cache replacing method provided according to the present disclosure.

In an optional implementation, as shown in FIG. 5B, the step flows of the method may further include: step S11, when it is determined that the second application currently running is an application running on the CPU; step S12, determining a running type of the second application according to a performance parameter of the second application; step S13, determining a cache priority of the second data accessed by the second application according to the running type of the second application, the cache priority of the second data including the highest cache priority.

After the step of determining a cache replacement algorithm to be used according to an algorithm type identifier recorded in step S40 is re-executed, step S51 is executed, the second data is cached into the cache queue of the shared cache according to the determined cache replacement algorithm and the cache priority of the second data.

In the heterogeneous multi-core system, the CPU is mainly responsible for performing serial tasks and logic control, the GPU has great advantages in parallel computing. The currently running second application may be executed simultaneously or separately with the first application running on the GPU. When the second application is an application running on the CPU, a running type of the second application may be further determined according to a performance parameter of the second application. Specifically, the running type of the second application may be determined according to values of two parameters APKI and USpeedup as described above. For example, the application running on the CPU may be classified into three types: Cache-Friendly application, Large-Working Set application, and Compute-Intensive application. Exemplarily, the running type of the second application may be classified according to a set thresholds, for example: when the application's APKI>α and USpeedup>β, the application is a Cache-Friendly type; when the application's APKI>α and USpeedup<β, the application is a Large-Working Set type; when the application's APKI<α, the application is a Compute-Intensive type.

The above-described thresholds α and β may be set empirically, for example, α=5, β=15%.

When the second application is a Cache-Friendly application, a lower cache priority may be set for it. That is, the second data accessed by the second application is cached in the shared cache queue in a position closer to the tail of the queue, so that the second data can be replaced out of the shared cache queue in a short period of time. That is, the second data can be eliminated faster. When the second application is a Compute-Intensive application, the number of its threads is larger, a higher cache priority can be set for it, that is, the second data accessed by the second application is cached in the shared cache queue in a position closer to the head of the queue, the second data has a longer life cycle in the shared cache queue. And likewise, when the second application is a Large-Working Set application, the corresponding cache priority is set for the second application and the second data accessed by the second application is stored in a corresponding position in the shared cache queue.

The architecture in difference between the GPU and the CPU leads to the different access memory characteristics of the two, applications running on the CPU have more sensitive cache requirements than applications running on the GPU. Based on this, in the embodiments, the cache priority of the second data accessed by the second application running on the GPU includes the highest cache priority, so that the second data accessed by the second application running on the CPU has a longer life cycle and a higher priority than the first data accessed by the first application running on the GPU. Thus, the second application running on the CPU can relatively acquire more space of the shared cache.

Specifically, when an access request is from the first application running on the GPU, the first data accessed by the first application is inserted into a position other than the highest cache priority in the cache queue, and the specific insertion position is to be further determined according to the cache priority of the first data. When an access request is from the second application running on the CPU, the second data accessed by the second data is inserted into the cache queue in a position that includes the highest cache priority position, and the specific insertion position is to be further determined according to the cache priority of the second data. Thus, even if the first application running on the GPU continuously requests the shared cache resource, since it is not allocated in the position with the highest cache priority in the cache queue, an upper limit of its position in the shared cache resource is defined, so that the second data accessed by the second application running on the CPU has a longer life cycle in the cache queue than the first data accessed by the first application running on the GPU. Accordingly, in a practical situation that the second application on the CPU has a higher cache sensitivity than the first application running on the GPU, the second application running on the CPU is made to obtain more shared cache space relatively, and allocation of the shared cache resource is more reasonable, which prevents the first application running on the GPU from squeezing the cache resources of the second application running on the CPU, overall utilization of the cache is improved, CPU performance is improved without degrading GPU performance, resulting in overall performance of the shared cache is improved, which is conductive to improve computing capability and computing speed of the heterogeneous multi-core system.

According to the embodiments of the present application, the cache replacing method may further include the following steps: determining whether the first data and/or the second data hits the cache queue; if not, determining whether an address of the first data and/or an address of the second data is present in the removal information queue: if yes, increasing the number of times of hitting the removal information queue, and if not, increasing the number of times of failing to hit the removal information queue.

Figure 6:
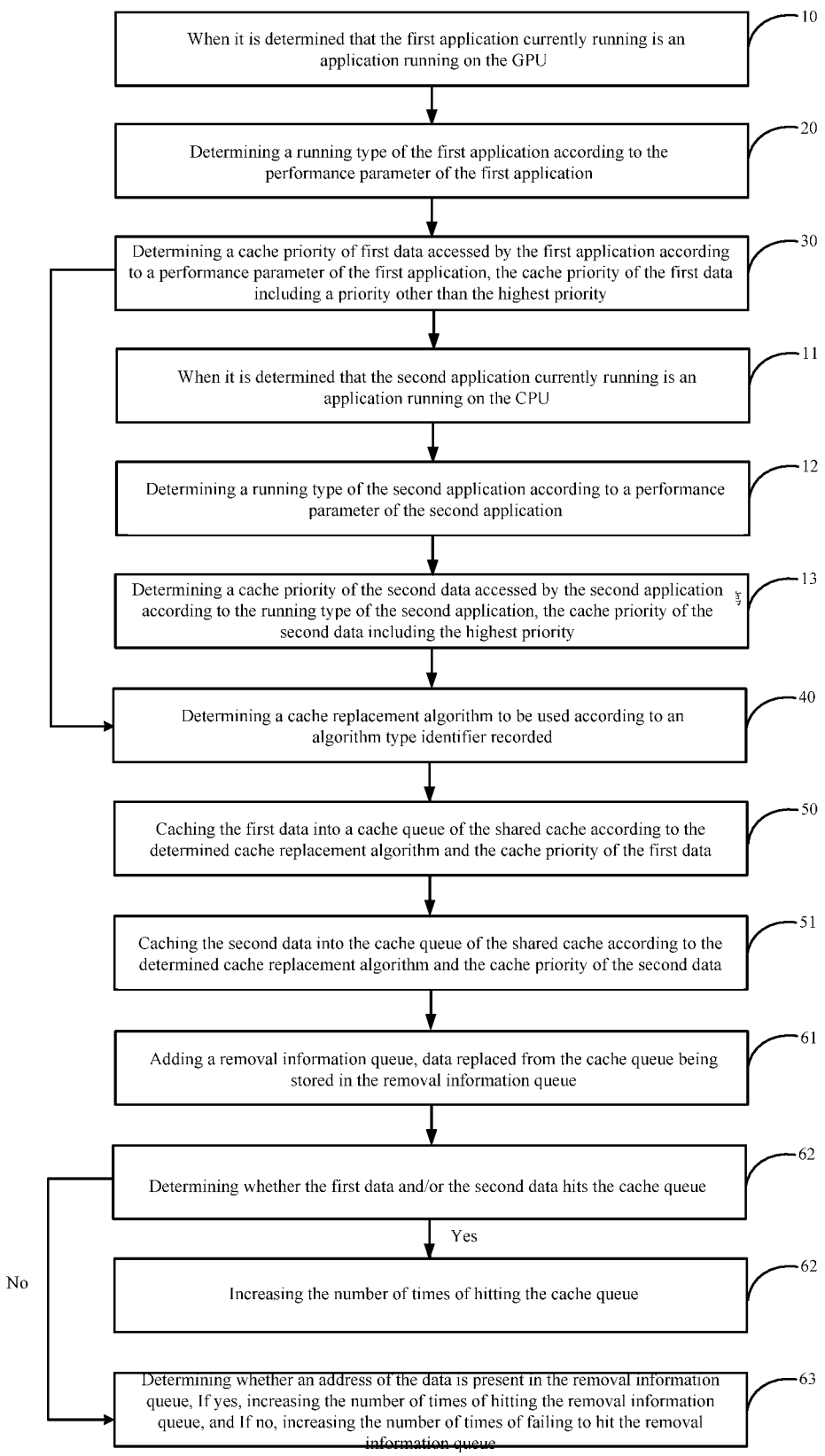
FIG. 6 is a flowchart of a cache replacing method provided according to still another exemplary embodiment of the present disclosure.

In an optional implementation, as shown in the FIG. 6, the step flows of said method may include: step S61, adding a removal information queue, data replaced from the cache queue being stored in the removal information queue; step S62, determining whether the first data and/or the second data hits the cache queue; step S63, if hits the cache queue, that is, the data is present in the cache queue, increasing the number of times of hitting the cache queue; step S64, if fails to hit the cache queue, that is, the data is not present in the cache queue, determining whether an address of the data is present in the removal information queue, in the case of being present in the removal information queue, increasing the number of times of hitting the removal information queue, and in the case of being not present in the removal information queue, increasing the number of times of failing to hit the removal information queue.

In the embodiments, a removal information queue is set, which may be referred to as a Qout queue. And the removal information queue is a queue in which related information of data (i.e., eliminated data) removed from the cache queue is stored, when data is removed from the cache queue, information of the data is placed in the removal information queue, and the respective removed data can be arranged in the order of the eliminated time, information of the earliest eliminated data is located at the tail of the removal information queue, that is, the LRU bit of the removal information queue, information of the latest eliminated data is located at the head of the removal information queue, that is, the MRU bit of the removal information queue.

A length of the removal information queue can be set as needed, and may be the same as or different from a length of the cache queue. The removal information queue may save only information such as the address of the data, the recently accessed degree (such as for LRU algorithm), and the number of times of being accessed (such as for LFU algorithm), the removal information queue differs from the cache queue in that data content is not stored, and so its consumption of storage space and computational overhead are small.

When it is required to insert the first data accessed by the first application into the cache queue, it may first determine whether the first data hits the cache queue, and if the first data hits, the first data is inserted into the cache queue by adopting the determined cache replacement algorithm and according to the cache priority of the first data, data with the lowest priority in the cache queue is removed from the cache queue, and information of the removed data is added to the removal information queue.

If the first data fails to hit, further, it is determined whether the address of the first data is in the removal information queue, and if yes, it hits the removal information queue, which indicates that the first data is eliminated from the cache queue not long ago, and the number of times of hitting the removal information queue is increased; if not, it fails to hit the removal information queue, indicating that the first data has been eliminated from the cache queue at an earlier time, the number of times of failing to hit the removal information queue is increased.

Similarly, when the second data accessed by the second application needs to be inserted into the cache queue, it is the same as the manner of processing the first data as described above, and details are not described herein again.

In the embodiments, by means of adding the removal information queue, related information of the data removed from the cache queue can be recorded, and when the first data or the second data fails to hit the cache queue, the first data or the second may be further determined as to whether present in the removal information queue through the address of the first data or the second, that is, whether the first data or the second data is removed from the cache queue not long ago, by means of recording the number of times of hitting the cache queue, the number of times of hitting the removal information queue, and the number of times of failing to hit the removal information queue, rationality of the cache replacement algorithm used can be judged.

In some examples, the method further includes: step S65, determining whether the number of times of hitting the removal information queue is greater than the number of times of failing to hit the removal information queue; and step S66, if yes, updating an algorithm type identifier recorded, and determining a cache replacement algorithm to be used according to the algorithm type identifier updated.

In the embodiments, it is further determined whether the number of times of hitting the removal information queue is greater than the number of times of failing to hit the removal information queue. If it is determined that the number of times of hitting the removal information queue is greater than the number of times of failing to hit the removal information queue, it suggests that most of the most recently accessed data that needs to be inserted into the cache queue can be found in the removal information queue. It also shows that the currently used cache replacement algorithm has a lower hit rate. In this case, the algorithm type identifier recorded is updated, the algorithm type identifier updated identifies another algorithm that is different from the current cache replacement algorithm, replacing the currently used cache replacement algorithm with another cache replacement algorithm helps to improve the hit rate for cache.

For example, if the LRU algorithm is currently used, the removal information queue stores information about the data that is eliminated according to the access time. If most of the most recently accessed data that needs to be inserted into the cache queue can be found from the removal information queue, it suggests that it is unreasonable to replace data in the cache queue according to the access time, and the hit rate is low. At this time, another algorithm, such as the LFU algorithm, may be used as the strategy for eliminating data in the cache queue based on the access frequency, which can improve the hit rate.

When the running type of the first application running on the GPU changes, its type of accessing data may probably also change. If the current cache replacement algorithm is used as the cache replacement strategy, the data accessed by the first application will have a low hit rate in the cache queue, which affects the data processing efficiency of the first application, thereby the algorithm type identifier is updated, the cache replacement algorithm is determined according to the updated algorithm type identifier. Thus, in the embodiments, the cache replacement algorithm is adaptively and dynamically adjusted according to change of the accessing data type by the first application, thereby the hit rate can be improved, the data processing efficiency of the first application can be improved, the throughput of the heterogeneous multi-core system can be improved, and the response time can be shortened.

Determining a cache replacement algorithm to be used according to an algorithm type identifier recorded as defined in step S40 in the above includes: if the algorithm type identifier is a first identifier, determining that the cache replacement algorithm to be used is the Least Recently Used LRU algorithm, and if the algorithm type identifier is a second identifier, determining that the cache replacement algorithm to be used is the Least Frequently Used LFU algorithm.

The LRU algorithm and LFU algorithm are two different cache replacement strategies, the LRU algorithm is to eliminate and replace data based on the application's access time to the cache, the LFU algorithm is to eliminate and replace data based on the application's access frequency to the cache. In the embodiments, it is possible to dynamically and adaptively switch to the LRU algorithm or the LFU algorithm according to the different applications' access times and access frequencies to the cache.

In the embodiments, different characteristics of the cache access time and the access frequency of different applications to the cache are considered, and it is possible to dynamically and adaptively switch to the LRU algorithm or the LFU algorithm according to different cache access characteristics showed in running process of different applications, one of the recently accessed degree and the access frequency is used as the cache replacement algorithm strategy, thereby determining the data to be eliminated so as to improve the cache hit ratio.

The algorithm type identifier may be a default identifier at the time of initialization, for example, a first identifier. The initially used cache replacement algorithm may be determined as the LRU algorithm according to the first identifier, and data in the cache queue is eliminated based on the Least Recently Used strategy and the eliminated data may be added to the removal information queue, when the data accessed by the application fails to hit the cache queue It can be further determined whether it is located in the removal information queue based on the address of the first data or the second data, and when hitting the removal information queue, if the number of times of hitting the removal information queue is greater than the number of times of failing to hit the removal information queue, and the first identifier is updated to a second identifier, the cache replacement algorithm is determined to be the LFU algorithm according to the second identifier, and data in the cache queue is eliminated based on the most recently used strategy.

The embodiments of the present disclosure further provides a cache replacing apparatus applied to a heterogeneous multi-core system, the heterogeneous multi-core system includes at least one central processing unit CPU, at least one graphic processing unit GPU and a shared cache.

Figure 7A:
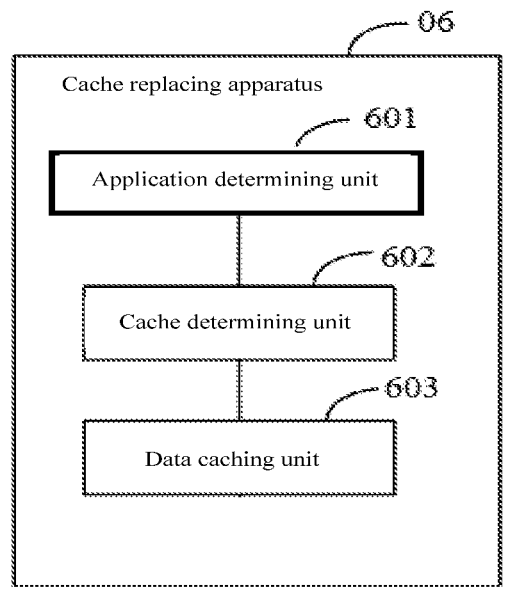
FIG. 7A shows a schematic block diagram of a cache replacing apparatus provided according to the embodiments of the present disclosure.

FIG. 7A shows a schematic block diagram of a cache replacing apparatus provided according to the embodiments of the present disclosure, As shown in FIG. 7A, the cache replacing apparatus 06 according to the present disclosure may include an application determining unit 601, a cache determining unit 602 and a data caching unit 603.

The application determining unit 601 may be configured to determine whether a first application currently running is an application running on the GPU. The cache determining unit 602 may be configured to, when it is determined that the first application currently running is an application running on the GPU, determine a cache priority of first data accessed by the first application according to a performance parameter of the first application, the cache priority of the first data including a priority other than a predefined highest cache priority. The data caching unit 603 may be configured to cache the first data into a cache queue of the shared cache according to a predetermined cache replacement algorithm and the cache priority of the first data, and replace data in the cache queue.

According to the embodiments of the present disclosure, the application determining unit 601 is further configured to: determine whether a second application currently running is an application running on the CPU. The cache determining unit 602 is further configured to: when it is determined that the second application currently running is an application running on the CPU, determine a cache priority of the second data accessed by the second application according to a performance parameter of the second application, the cache priority of the second data including the predefined highest cache priority. The data caching unit 603 is further configured to: cache the second data into a cache queue of the shared cache according to a predetermined cache replacement algorithm and the cache priority of the second data, and replace data in the cache queue.

According to the embodiments of the present disclosure, the cache determining unit may include a running type determining unit and a cache priority determining unit. The running type determining unit may be configured to determine a running type of the first application according to the performance parameter of the first application, and determine a running type of the second application according to the performance parameter of the second application. The cache priority determining unit may be configured to determine the cache priority of the first data accessed by the first application according to the running type of the first application, and determine the cache priority of the second data accessed by the second application according to the running type of the second application.

Figure 7B:
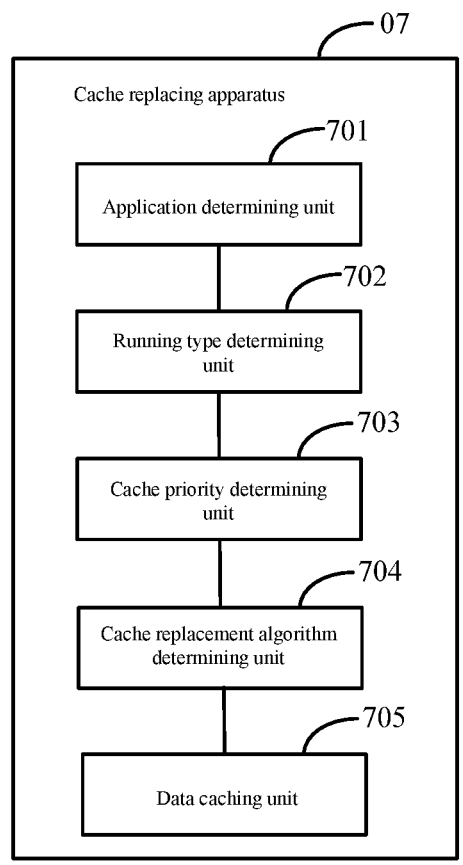
FIG. 7B shows still another exemplary block diagram of a cache replacing apparatus provided according to the embodiments of the present disclosure.

FIG. 7B shows still another exemplary block diagram of a cache replacing apparatus provided according to the embodiments of the present disclosure. As shown in FIG. 7B, the cache replacing apparatus 07 may include: an application determining unit 701 configured to determine whether a first application currently running is an application running on the GPU; a running type determining unit 702 configured to determine a running type of the first application according to a performance parameter of the first application; a cache priority determining unit 703 configured to determine a cache priority of first data accessed by the first application according to the running type of the first application, the cache priority of the first data including a priority other than the predefined highest cache priority a cache replacement algorithm determining unit 704 configured to determine a cache replacement algorithm to be used according to an algorithm type identifier recorded; a data caching unit 705 configured to cache the first data into a cache queue of the shared cache according to the determined cache replacement algorithm and the cache priority of the first data, and replace data in the cache queue.

In an optional implementation, in the cache replacement apparatus: the application determining unit is further configured to: when it is determined that the second application currently running is an application running on the CPU; the running type determining unit is further configured to: determine a running type of the second application according to a performance parameter of the second application; the cache priority determining unit is further configured to: determine a cache priority of the second data accessed by the second application according to the running type of the second application, the cache priority of the second data including the highest cache priority; the data caching unit is further configured to: cache the second data into a cache queue of the shared cache according to a predetermined cache replacement algorithm and the cache priority of the second data, and replace data in the cache queue.

In an optional implementation, the cache replacement apparatus further includes: a removal information queue adding unit configured to add a removal information queue, data replaced from the cache queue being stored in the removal information queue; a cache queue hit determining unit configured to determine whether the first data and/or the second data hits the cache queue; and a removal information queue determining unit configured to, when it is determined that the first data and/or the second data hits the cache queue, determine whether an address of the first data and/or an address of the second data is present in the removal information queue, if yes, increase the number of times of hitting the removal information queue, and if not, increase the number of times of failing to hit the removal information queue.

The cache replacing apparatus further includes: a number of times of cache queue increasing unit configured to increase the number of times of hitting the cache queue when it is determined that the first data and/or the second data hits the cache queue.

In some examples, the cache replacing apparatus further includes: a cache replacement algorithm updating unit configured to, when it is determined that the number of times of hitting the removal information queue is greater than the number of times of failing to hit the removal information queue, update an algorithm type identifier, and determine a cache replacement algorithm to be used according to the algorithm type identifier updated.

Corresponding to the foregoing embodiments of the cache replacing method, the cache replacing apparatus provided by the present disclosure improves overall utilization of the cache while ensuring performance of the GPU, which is conductive to improve computing capability and computing speed of the heterogeneous multi-core system.

As to functions of the respective units and function implementation process of the respective units in the apparatus embodiments, reference may be made to implementations of the corresponding steps in the foregoing method, details are not described herein again.

The apparatus embodiments described above are merely illustrative, wherein the units described as separate components may or may not be physically separated, i.e. they may be located in one place, or may be distributed over multiple network units; the above respective units may be combined into one unit, or may be further split into a plurality of sub-units.

Through description of the foregoing implementations, the apparatus in the embodiment may be implemented by software, or by software plus necessary general hardware, and may of course be implemented also by hardware. Based on such understanding, the essence of the technical solutions of the present disclosure or the part that contributes to the prior art may be embodied in the form of a software product, taking the software implementation as an example, an apparatus in a logical sense is formed in the way of reading corresponding computer program instructions in the non-volatile memory into the memory by a system processor of the heterogeneous multi-core system to which said apparatus is applied, and executing the instructions.

Figure 8:
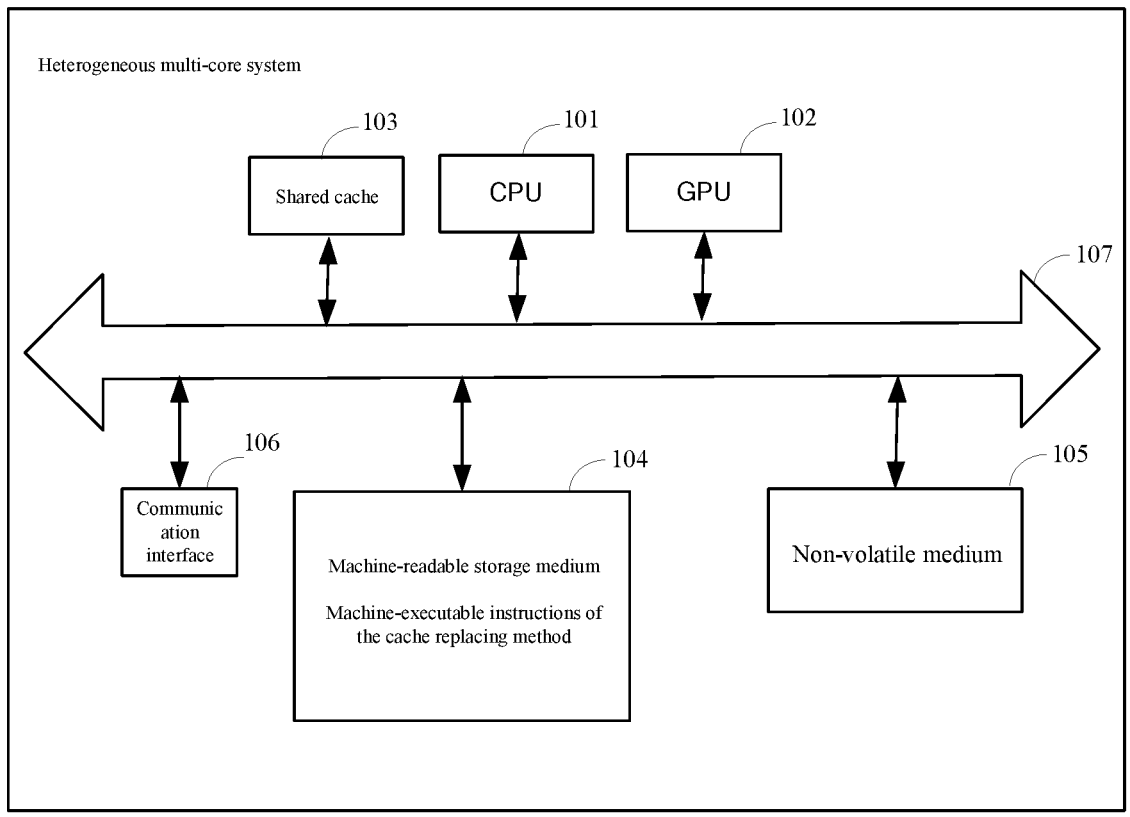
FIG. 8 is a hardware structural diagram of a heterogeneous multi-core system provided according to the embodiments of the present disclosure.

Referring to FIG. 8, the present disclosure also provides a heterogeneous multi-core system, the heterogeneous multi-core system includes at least one central processing unit CPU 101, at least one graphic processing unit GPU 102 and a shared cache 103, the heterogeneous multi-core system further includes a machine-readable storage medium 104, and may further include a non-volatile medium 105, a communication interface 106 and a bus 107. The central processing unit CPU 101, the graphic processing unit GPU 102, the shared cache 103, the machine-readable storage medium 104, the non-volatile medium 105 and the communication interface 106 may communicate with each other via the bus 107. The central processing unit CPU 101 may perform any of the above-described cache replacing method by reading and executing machine-executable instructions corresponding to control logic of the cache replacing method as stored in the machine-readable storage medium 104.

The machine-readable storage medium referred to herein may be any electronic, magnetic, optical storage device, or other physical storage device that can contain or store information such as executable instructions, data, and so on. For example, the machine-readable storage medium may be: an RAM (Radom Access Memory), a volatile memory, a non-volatile memory, a flash memory, a storage drive (such as a hard disk drive), any type of storage disk (such as a compact disk, dvd, etc.), or a similar storage medium, or a combination thereof, the shared cache may be an RAM (Radom Access Memory), a volatile memory or a flash memory.

The non-volatile medium may be a non-volatile memory, a flash memory, a storage drive (such as a hard drive), any type of storage disk (such as a compact disc, dvd, etc.), or a similar non-volatile storage medium, or a combination thereof.

Of course, the heterogeneous multi-core system described above may also include other conventionally-existed components, and details are not described herein again.

Other embodiments of the present application will become readily apparent to those skilled in the art after considering and implementing what is disclosed in the specification. The present application is intended to cover any variations, uses, or adaptations of the present application, these variations, uses, or adaptations are in accordance with the general principles of the present application and include common knowledge or common technical means in the art that are not disclosed herein. The specification and embodiments are to be regarded as illustrative only, the true scope and spirit of the present application are specified by the claims.

The present application claims priority to Chinese Patent Application No. 201810708886.3 filed on Jul. 2, 2018, the entire disclosure of which is hereby incorporated by reference as a part of the present application.

What is claimed is:

1. A cache replacing method applied to a heterogeneous multi-core system, the heterogeneous multi-core system including at least one central processing unit CPU, at least one graphic processing unit GPU and a shared cache, wherein a first application is running on the GPU, the method including:
   determining a cache priority of first data accessed by the first application according to a performance parameter of the first application, the cache priority of the first data including a priority other than a predefined highest cache priority;
   caching the first data into a cache queue of the shared cache according to a predetermined cache replacement algorithm and the cache priority of the first data, and replacing data in the cache queue;
   adding a removal information queue, data replaced from the cache queue being stored in the removal information queue;
   determining, for the first data, whether a number of times of hitting the removal information queue is greater than a number of times of failing to hit the removal information queue; and
   if yes, updating an algorithm type identifier, and determining a cache replacement algorithm to be used according to the updated algorithm type identifier.

2. The method of claim 1, wherein a second application is running on the CPU, the method further including:
   determining a cache priority of second data accessed by the second application according to a performance parameter of the second application, the cache priority of the second data including the predefined highest cache priority; and caching the second data into the cache queue of the shared cache according to the predetermined cache replacement algorithm and the cache priority of the second data, and replacing data in the cache queue.

3. The method of claim 2, wherein determining a cache priority of first data accessed by the first application according to a performance parameter of the first application includes:
determining a running type of the first application according to the performance parameter of the first application, and determining the cache priority of the first data accessed by the first application according to the running type;
determining a cache priority of second data accessed by the second application according to a performance parameter of the second application includes:
determining a running type of the second application according to the performance parameter of the second application, and determining the cache priority of the second data accessed by the second application according to the running type.

4. The method of claim 3, further including:
determining whether the first data and/or the second data hits the cache queue,
if not, determining whether an address of the first data and/or an address of the second data is present in the removal information queue:
if yes, increasing the number of times of hitting the removal information queue, and if not, increasing the number of times of failing to hit the removal information queue.

5. The method of claim 4, further including:
determining, for the second data, whether the number of times of hitting the removal information queue is greater than the number of times of failing to hit the removal information queue;
if yes, updating an algorithm type identifier, and
determining a cache replacement algorithm to be used according to the algorithm type identifier updated.

6. The method of claim 5, wherein determining a cache replacement algorithm to be used according to the algorithm type identifier updated includes:
if the algorithm type identifier is a first identifier, determining that the cache replacement algorithm to be used is the Least Recently Used LRU algorithm, and if the algorithm type identifier is a second identifier, determining that the cache replacement algorithm to be used is the Least Frequently Used LFU algorithm.

7. A heterogeneous multi-core system, including at least one central processing unit CPU, at least one graphic processing unit GPU and a shared cache, and further including a machine-readable storage medium having stored therein machine-executable instructions executable by a processor, the processor is enabled by the machine-executable instructions to perform the method of claim 1.

8. A cache managing method applied to a heterogeneous processing system in which a central processing unit CPU and a graphic processing unit GPU that share a cache are included, the method including:
determining a type of a processor on which an application is running;
determining a cache priority of the data accessed by the application based on the type of the processor on which the application is running and a performance parameter of the application;
caching the data accessed by the application into a cache queue of the shared cache according to a predetermined cache replacement algorithm and the cache priority of the data, and replacing data in the cache queue;
adding a removal information queue, wherein the data replaced from the cache queue being stored in the removal information queue;
determining, for the data accessed by the application, whether a number of times of hitting the removal information queue is greater than a number of times of failing to hit the removal information queue; and
if yes, updating an algorithm type identifier, and determining the cache replacement algorithm to be used according to the updated algorithm type identifier.

9. The method of claim 8, wherein determining a cache priority of the data accessed by the application includes:
determining a running type of the application according to the performance parameter of the application, and determining the cache priority of the data accessed by the application according to the running type.

10. The method of claim 8, further including:
setting the highest level of a CPU application's cache priority to be higher than the highest level of a GPU application's cache priority,
wherein the CPU application corresponds to an application running on the CPU, and the GPU application corresponds to an application running on the GPU.

11. The method of claim 8, further including:
in the case where the data fails to hit the cache queue, caching the data into the cache queue according to the cache priority of the data, and replacing data in the cache queue according to a predetermined cache replacement algorithm.

12. The method of claim 11, further including:
determining whether the data accessed by the application hits the cache queue,
in the case of failing to hit the cache queue, determining whether an address of the data is present in the removal information queue: in the case of being present in the removal information queue, increasing the number of times of hitting the removal information queue, and in the case of being not present in the removal information queue, increasing the number of times of failing to hit the removal information queue; and
determining the cache replacement algorithm based on the number of times of hitting the removal information queue and the number of times of failing to hit the removal information queue.

13. A heterogeneous multi-core system, including a central processing unit CPU and a graphic processing unit GPU that share a cache, and further including a machine-readable storage medium having stored therein machine-executable instructions executable by a processor, the processor is enabled by the machine-executable instructions to perform the method of claim 8.

14. A cache replacing apparatus applied to a heterogeneous multi-core system, the heterogeneous multi-core system including at least one central processing unit CPU, at least one graphic processing unit GPU and a shared cache, wherein a first application is running on the GPU, the apparatus including:
a cache determining circuit configured to, determine a cache priority of first data accessed by the first application according to a performance parameter of the first application, the cache priority of the first data including a priority other than a predefined highest cache priority;
a data caching circuit configured to, cache the first data into a cache queue of the shared cache according to a predetermined cache replacement algorithm and the cache priority of the first data, and replace data in the cache queue;

a removal information queue adding circuit configured to add a removal information queue, data replaced from the cache queue being stored in the removal information queue;

a cache replacement algorithm updating circuit configured to, determine, for the first data, whether a number of times of hitting the removal information queue is greater than a number of times of failing to hit the removal information queue, if yes, update an algorithm type identifier, and determine a cache replacement algorithm to be used according to the updated algorithm type identifier.

15. The apparatus of claim 14, wherein a second application is running on the CPU, the cache determining circuit is further configured to: determine a cache priority of second data accessed by the second application according to a performance parameter of the second application, the cache priority of the second data including the predefined highest cache priority; and the data caching circuit is further configured to: cache the second data into the cache queue of the shared cache according to the predetermined cache replacement algorithm and the cache priority of the second data, and replace data in the cache queue.

16. The apparatus of claim 15, wherein the cache determining circuit includes:

a running type determining circuit configured to determine a running type of the first application according to the performance parameter of the first application, and determine a running type of the second application according to the performance parameter of the second application; and a cache priority determining circuit configured to determine the cache priority of the first data accessed by the first application according to the running type of the first application, and determine the cache priority of the second data accessed by the second application according to the running type of the second application.

17. The apparatus of claim 16, further including:

a cache queue hit determining circuit configured to determine whether the first data and/or the second data hits the cache queue; and a removal information queue determining circuit configured to, when it is determined that the first data and/or the second data fails to hit the cache queue, determine whether an address of the first data and/or an address of the second data is present in the removal information queue, if yes, increase the number of times of hitting the removal information queue, and if not, increase the number of times of failing to hit the removal information queue.

18. The apparatus of claim 17, wherein, the cache replacement algorithm updating circuit is further configured to, when it is determined, for the second data, that the number of times of hitting the removal information queue is greater than the number of times of failing to hit the removal information queue, update an algorithm type identifier, and determine a cache replacement algorithm to be used according to the algorithm type identifier updated.

* * * * *